Dec. 17, 1940.                R. BOWEN                2,225,254
                             ANIMAL TRAP
                         Filed Dec. 18, 1939
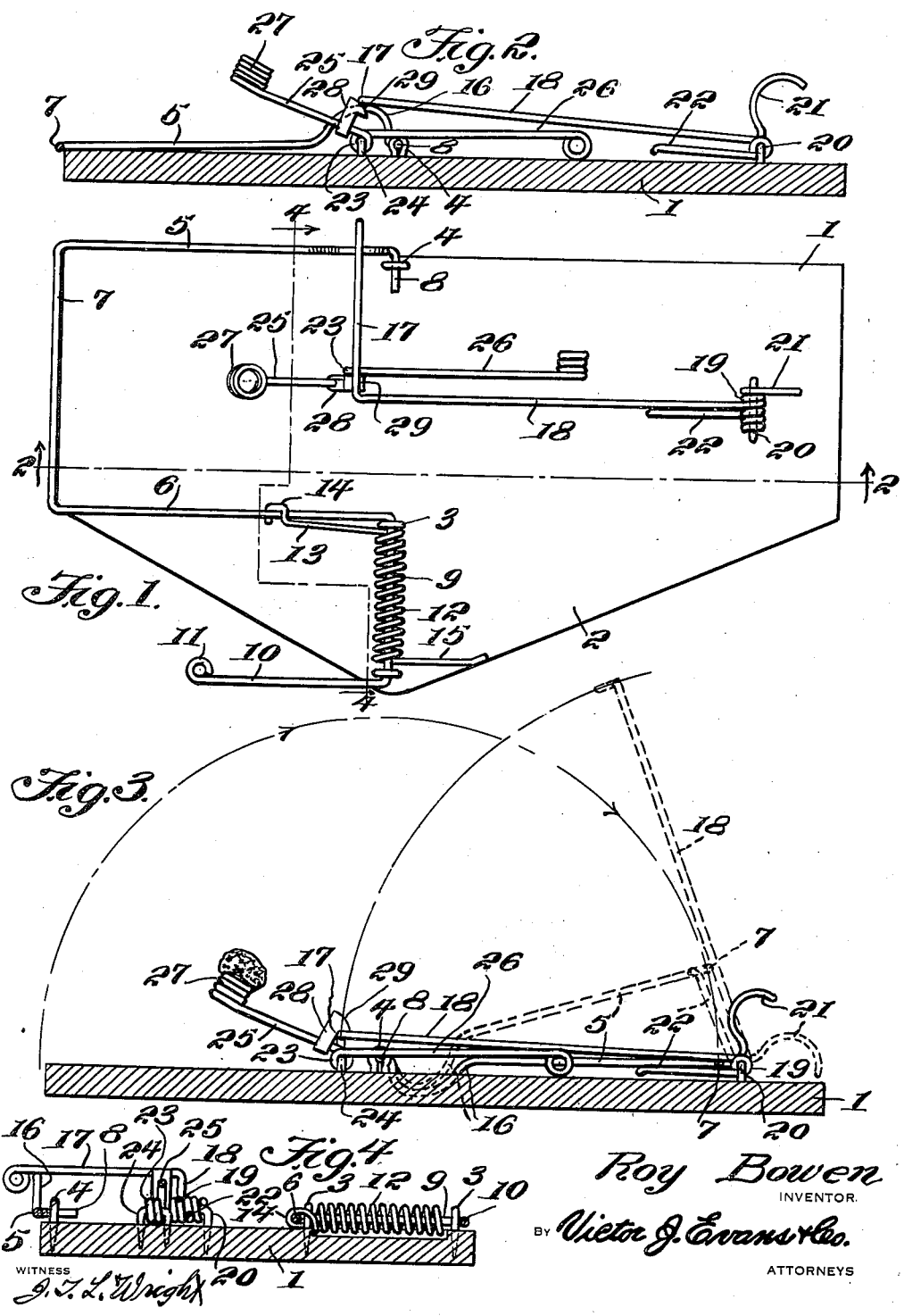
Roy Bowen
INVENTOR.
BY Victor J. Evans & Co.
ATTORNEYS
WITNESS
J. T. L. Wright Patented Dec. 17, 1940

2,225,254

UNITED STATES PATENT OFFICE 2,225,254

ANIMAL TRAP

Roy Bowen, Hoopeston, Ill.

Application December 18, 1939, Serial No. 309,871

3 Claims. (Cl. 43—83.5)

This invention relates to animal traps, and its general object is to provide a trap primarily designed for catching rodents and the like, and which includes a handled spring pressed bail type jaw member having the other trap elements associated therewith and with each other, in a manner whereby the trap can be set, merely by moving the jaw member by its handle to set position, thus eliminating the possibility of injury to the person setting the trap.

A further object is to provide a mouse trap that is simple in construction, inexpensive to manufacture, extremely sensitive, and efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a top plan view illustrating the trap in sprung or normal position.

Figure 2 is a sectional view taken approximately on line 2—2 of Figure 1, looking in the direction of the arrows.

Figure 3 is a vertical sectional view like Figure 2, but illustrates the trap in set position in full lines and the direction of movement of the elements thereof by arrows when being set, and the intermediate position of said elements in dotted lines.

Figure 4 is a sectional view taken approximately on line 4—4 of Figure 1, looking in the direction of the arrows.

Referring to the drawing in detail, it will be noted that the base 1 is shown as being of flat elongated formation and includes a laterally directed substantially triangular shaped extension 2, straight ends, and a straight side opposite to the extension.

Secured to the extension and rising therefrom is a pair of spaced parallel staples 3 and secured accordingly adjacent to the straight side edge, is a like staple 4 aligned with the staples 3 for pivotally receiving a bail type jaw member that is formed from a single strand of wire bent to provide parallel arms 5 and 6 and a bight portion 7. The arm 5 is bent inwardly to provide a trunnion 8 mounted in the staple 4 and from the arm 6, the strand is bent to provide a straight portion or shaft 9 extending transversely of the extension 2 and mounted in the staples 3 for cooperation with the trunnion for rockably mounting the jaw member, for the latter to cooperate with one end portion of the base to set up a clamping engagement therewith, as will be apparent upon inspection of Figures 1 and 2. From the shaft 9 the strand is bent at right angles thereto, to provide a handle 10 paralleling the arms and terminating in an eye 11 to provide a convenient gripping means, as will be apparent.

Sleeved on the shaft 9 is a coil spring 12 having a finger 13 extending from one end thereof and terminating in a hook 14 mounted on the arm 6, while extending from the opposite end of the spring is a finger 15 engaged with the extension 2. By that construction, it will be obvious that the jaw member is normally held in clamping engagement with the base, and is movable against the action of its spring by the handle which is disposed beyond the extension to facilitate gripping the same, as will be apparent upon inspection of Figure 1.

The arm 5 is shaped in curved formation adjacent to its pivoted end, to provide a support 16 arranged in the path of the right angularly bent end portion 17 of a keeper member that is likewise made from a single strand of wire, and the major portion 18 thereof extends longitudinally of the base, while the portion 17 extends transversely thereof, with its free end normally resting upon the support 16, as best shown in Figure 2. The end of the portion 18 opposite to the portion 17 is coiled upon itself as at 19, with the coiled portion pivotally mounted on a staple 20 secured to and rising from the base, and from the coiled portion 19, the strand of the keeper member extends into a rearwardly directed arcuate abutment member 21 engageable with the base to limit the upward swinging movement of the keeper member, as indicated in dotted lines in Figure 3. Coiled about the staple 20 is an end portion of a keeper finger 22 that is fixed to the coiled portion 19 to be carried thereby and the finger 22 is disposed in parallelism with the portion 18 for cooperation therewith, to receive the bight portion 7 between the finger 22 and portion 18, as shown in Figure 3, for holding the jaw member in set position.

The bait holder and trigger member likewise include a single strand of wire in the structure thereof and this strand is bent to provide an eye 23 pivotally mounted on a staple 24 secured to and rising from the base, slightly forwardly beyond the transverse center thereof. From the eye 23, the strand extends in diverging portions 25 and 26, the portion 25 being shorter than the portion 26 and terminates in a plurality of superimposed coils to provide a bait receptacle 27, while the long portion likewise terminates in coils and due to the length thereof together with the coils on its outer end, the long portion will counter-balance the short portion, together with the bait receptacle and the bait to hold the short portion normally at an elevated inclination, as clearly shown in Figure 3. Secured to the short portion adjacent to the pivot thereof is a trigger latching lug 28 in the form of a hook and having a cammed outer face 29 disposed in the path of the bent end portion 17 of the keeper member for directing the same within the hook, as shown in Figure 3, to hold the jaw member in set position through the medium of the keeper member.

It is believed from the foregoing that the operation of my trap is obvious, but it might be mentioned that when it is desired to set the same, the jaw member is moved against the action of the spring 12, by the handle 10, in the direction of the arrows of Figure 3, and such movement will elevate the keeper member to the dotted line position of Figure 3 for the disposal of the bight portion 7 between the portion 18 and keeper finger 22. When the bight portion is disposed accordingly, the keeper member will drop by gravity against the cammed face 29, as shown by the arrows in Figure 3. The weight of the keeper member against the face 29 will cause the bait holder and trigger member to move on its pivot, to an extent to allow the portion 17 to be caught in the hook of the lug 28, as shown in full lines in Figure 3, thus it will be seen that the trap can be set, merely by the use of the handle 10, thereby preventing injury to the operator.

After the trap has been set, and if an animal should attempt to remove the bait from the receptacle 27, it will be further obvious that the bait holder and trigger member will be moved on its pivot, to release the keeper member from the hook of the lug 28. When released, the jaw member is likewise released and the latter is snapped from its set position of Figure 3 to its clamping or normal position of Figure 2, so as to cooperate with the base to catch and hold the animal which can be released from the trap, upon again moving the handle 10.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. An animal trap comprising a base, a bail type jaw member including parallel arms, a trunnion formed on one arm, a shaft on the other arm and together with the trunnion being pivotally connected to the base for swinging movement of the jaw member, a spring sleeved on the shaft and engaged with the base and the adjacent arm to urge and hold the jaw member in clamping engagement with the base, pivotally mounted keeper means for holding the jaw member in set position and engaged with one of said arms to be carried thereby for disposal of the keeper means in set position, means to limit the movement of the keeper means, said keeper means including parallel portions to receive the jaw member between the same to hold the jaw member in set position, counter-balanced bait holding and trigger means including a cammed latching lug arranged in the path of the keeper means to automatically latch the latter in set position, and a setting handle formed on the shaft.

2. An animal trap comprising a base, a spring pressed jaw member pivotally secured to the base for cooperation therewith to set up a clamping action, keeper means including a portion pivoted to the base adjacent one end thereof for disposal longitudinally of the base, a right angularly bent end portion formed on the longitudinally extending portion and disposed transversely of the base, a keeper finger fixed to the pivoted end of the longitudinally extending portion and disposed in parallelism therewith to receive the jaw member between the same to hold the jaw member in set position, said transversely disposed portion engaged with the jaw member to be carried thereby for disposal of the keeper means in set position, means to limit movement of the keeper means, counter-balanced bait holding and trigger means including a cammed latching lug arranged in the path of the transversely disposed portion to automatically latch the keeper means in set position, and a setting handle on the jaw member.

3. An animal trap comprising a base, a spring pressed jaw member pivotally secured to the base for cooperation therewith to set up a clamping action, spaced parallel arms included in said jaw member and one of said arms being shaped in curved formation to provide supporting means, keeper means for holding the jaw member in set position, said keeper means having one end pivotally secured to the base and its opposite end normally resting on the supporting means to be carried by the jaw member for disposal of the keeper means to set position, counter-balanced bait holding and trigger means including a long portion and a short portion disposed in diverging relation with respect to each other and pivoted to the base between said portions, said portions being formed from a single strand of wire and the short portion being coiled upon itself to provide a bait receptacle, said long portion being coiled upon itself at its free end to counter-balance the short portion for holding the latter normally elevated, a cammed latching lug fixed to the short portion and arranged in the path of the keeper means to automatically latch the latter in set position, and a setting handle on the jaw member.

ROY BOWEN.